(12) United States Patent
Huberman et al.

(10) Patent No.: US 7,006,999 B1
(45) Date of Patent: Feb. 28, 2006

(54) METHOD FOR ENABLING PRIVACY AND TRUST IN ELECTRONIC COMMUNITIES

(75) Inventors: Bernardo A. Huberman, Palo Alto, CA (US); Tad H. Hogg, Mountain View, CA (US); Matthew K. Franklin, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/568,794

(22) Filed: May 9, 2000

Related U.S. Application Data

(60) Provisional application No. 60/134,179, filed on May 13, 1999.

(51) Int. Cl.
  *G06F 17/60* (2006.01)

(52) U.S. Cl. .......................................... 705/74; 705/50
(58) Field of Classification Search ................... 705/50, 705/74; 713/182, 189; 380/277, 255
See application file for complete search history.

(56) References Cited

U.S. PATENT DOCUMENTS

| 5,245,657 | A | * | 9/1993 | Sakurai ....................... 380/25 |
| 5,483,597 | A | | 1/1996 | Stern ........................... 380/30 |
| 5,581,615 | A | | 12/1996 | Stern ........................... 380/25 |
| 6,434,238 | B1 | * | 8/2002 | Chaum ......................... 380/45 |

FOREIGN PATENT DOCUMENTS

| EP | 1 145 483 B1 | 10/2002 |
| FR | 2 700 430 | 7/1994 |
| FR | 2 714 780 | 7/1995 |
| WO | WO 95/30292 | * 11/1995 |
| WO | WO 00/45549 | 8/2000 |

OTHER PUBLICATIONS

Brickell et al., "Rustee-based Tracing Extensions to Anonymous Cash and the Making of Anonymous Change", Jan. 1995, ACM Press, Proceedings of the Sixth Annual ACM-–SIAM Symposium on Discret Algorithm, p. 457–466.*
Chang, Ai–Mei et al. "Electronic Communities as Intermediaries: the Issues and Economics," System Sciences, 1999. HICSS–32.Proceedings of the $32^{nd}$ Hawaii International Conference on Maui, HI, USA 5–8 Jan. 1999, Los Alamitos, CA, USA, IEEE Comput. Soc. US. 10 pp.
Partial European Search Report application number EP 00 11 0372 (U.S. Counterpart 09/568,794) 28 Feb. 2003.
Menezes et al., "Handbook of Applied Cryptography", CRC PRess, pg. 405–410, 414–416.*

* cited by examiner

*Primary Examiner*—James P. Trammell
*Assistant Examiner*—Jalatee Worjloh

(57) ABSTRACT

A method for enabling privacy and trust in electronic communities is disclosed. A major impediment to using recommendation systems and collective knowledge for electronic commerce is the reluctance of individuals to reveal preferences in order to find groups of people that share them. An equally important barrier to fluid electronic commerce is the lack of agreed upon trusted third parties. We propose new non-third party mechanisms to overcome these barriers. Our solutions facilitate finding shared preferences, discovering communities with shared values, removing disincentives posed by liabilities, and negotiating on behalf of a group. We adapt known techniques from the cryptographic literature to enable these new capabilities.

3 Claims, 5 Drawing Sheets

METHOD FOR ENABLING PRIVACY AND TRUST IN ELECTRONIC COMMUNITIES

CROSS REFERENCES TO RELATED APPLICATIONS

The present application is related to commonly assigned U.S. patent application Ser. No. 60/134,179, entitled "Method For Increasing the Efficiency of Negotiations without Revealing Information", which was filed May 13, 1999 concurrently with the present application.

FIELD OF THE INVENTION

The present invention relates to the field of electronic commerce, and in particular to a method for enabling privacy and trust in electronic communities.

BACKGROUND OF THE INVENTION

With the advent of the World Wide Web and the ease of entry enabled by the Internet, electronic commerce is becoming an increasing reality, with a consequent growth in the number and variety of information providers and e-commerce sites. While this growth generates a diverse set of offerings from which consumers can only benefit, it also makes it hard for people to choose, in part because it is difficult to judge a priori the value of the offerings. In addition, since providers of electronic commerce sometimes lack recognizable reputations and can offer similar services, it is seldom possible to make optimal decisions as to which sites to access and which ones to avoid. As with many other situations where choice is costly, people resort to a cooperative mechanism which relies on the collective search performed by a whole community to find desirable and useful sites. Large groups of people surfing and buying on their own can sample a much larger information space than single individuals, and any exchange of relevant findings can increase the awareness of possibly interesting sites. Even though recommendations, both personal and institutional, can be unreliable and highly idiosyncratic, they decrease the cost of searching for optimal sources of information, while leading to the discovery of new sites and improved ways of surfing the Web.

Given these considerations, one would expect to find within the Web sites and communities that issue useful recommendations on a number of topics. See W. C. Hill, L. Stead, M. Rosenstein and G. Furnas, "Recommending and evaluating choices in a virtual community of use", proc. CHI'95, (1995), 194–201; C. Avery and R. Zeckhauser, "Recommender systems for evaluating computer messages". Communications of the ACM 40, (1997), 88–89; and N. Glance, D. Arregui, and M. Dardenne, "Knowledge pump: supporting the flow and use of knowledge", in Information Technology for Knowledge Management. Eds. U. Borghoff and R. Pareschi, Springer (1998). This information can then be used to create recommendations for other users and to identify similar individuals, thereby helping to make informal communities apparent. But while a great deal of economically useful information is distributed widely within groups of people such as large organizations, communities of practice (see B. A. Huberman and T. Hogg, "Communities of practice: performance and evolution", Computational and Mathematical Organization Theory 1, (1995), 73–92), scientific communities and the economy at large, privacy issues make it hard to successfully exploit that knowledge. The limitations range from having to assess the quality of a recommendation from a group whose preferences might differ from the inquirer, to the natural reticence people have to reveal their preferences to an anonymous group with possibly different values. One issue that makes recommender systems perform below their potential is the difficulty of convincing potential advice-takers of the credibility and reliability of the recommendations. This depends in part on the willingness of potential recommenders to make available the right information at the right times. An important factor that dissuades potential recommenders from participating effectively is the risk that failed advice could lead to bruised reputations and liabilities. P. Samuelson, "Liability for Defective Electronic Information", Communications of the ACM 36, (1993), 21–26.

As in the physical world, there exist a number of useful mechanisms to circumvent problems of privacy, trust and liability. For example, a useful strategy for maintaining privacy consists in the anonymous posting of information. In recommender systems this can be useful when the recommendations are based on coarse characteristics such as the number of people voting for a particular choice. But anonymity has the drawback of preventing users from learning the usefulness of recommendations from particular people, track trends over time, and to use reputations which are built up over repeated interactions. The consistent use of pseudonyms can address some of these issues, but not all. One drawback of pseudonyms is that the very link which establishes reputation over time becomes a vulnerability if authorship can be established by other means for any pseudonymous message. Issues of privacy can also be tackled by the use of trusted third parties to mediate the exchange of information. However, it can be difficult to get everyone in a community to agree on a suitable third party, particularly when new users continually enter the system. Furthermore, the collection of all information by a single third party can lead to a system-wide failure if such a party is compromised. What is truly desirable is the enhancement of privacy and trust in electronic communities without having to resort to anonymity, pseudonymity, or trusted third parties.

SUMMARY OF THE INVENTION

A major impediment to using recommendation systems and collective knowledge for electronic commerce is the reluctance of individuals to reveal preferences in order to find groups of people that share them. An equally important barrier to fluid electronic commerce is the lack of agreed upon trusted third parties. A method for enabling privacy and trust in electronic communities is disclosed to overcome these barriers by facilitating the processes of finding shared preferences, discovering communities with shared values, removing disincentives posed by liabilities, and negotiating on behalf of a group.

An embodiment of the present invention provides a method for anonymously establishing a proving individual as a member for group, wherein the proving individual has a private key. An identification transcript is forged for least one unknown private key, wherein the transcript includes at least one forged commitment, at least one forged challenge, and at least one forged response. A valid commitment is calculated based on the proving individual's private key. The at least one forged commitment and a valid commitment are transmitted to a verifying individual. A verifying challenge is received from the verifying individual and a valid challenge is calculated based on the at least one challenge and the verifying challenge. A valid response is calculated based on the valid challenge in the valid commitment. The at least one forge challenge, the valid challenge, the at least one forged response, and the valid response are transmitted to the verifying individual. The identification transcript may comprise a commitment, a challenge, and a response from a Schnorr identification protocol. The method may also include the step of verifying that the forged challenge and the valid challenge are consistent with the verifying challenge. The method may also include the step of verifying to the forged response is consistent with a forged commitment and a forge challenge, and the step of verifying that the valid response is consistent with the valid commitment and in the valid challenge.

Another embodiment of the present invention provides a method for a signing individual to deniably sign a document intended for a recipient, wherein the signing individual as a private key and public key and the recipient has a public key. An identification transcript is forged for an unknown private key, wherein the transcript comprises a forged commitment, a forged challenge, and a forged response. A random factor is calculated and a valid commitment is calculated based on the random factor. A for a fine challenge is calculated as a cryptographic hash of the document, the forged commitment, the valid commitment, the signing individual's public key, in the recipient's public key. A valid challenge is calculated based on the verifying challenge on the forged challenge. A valid response is calculated based on the random factor, the valid challenge, in the signing individual's private key. The method may further include testing the forged identification transcript by verifying that the forged commitment, the forged challenge, and the forged response are consistent. The method may also include testing a valid identification transcript by verifying that the valid commitment, the valid challenge, and a valid response are consistent, and testing the challenge by verifying that the valid challenge and the forged challenge are consistent with the verifying challenge.

DETAILED DESCRIPTION

1. Introduction

The techniques of the present invention may be used to enhance privacy and trust in electronic communities without having to resort to anonymity, pseudonymity, or trusted third parties, through the novel application of existing cryptographic techniques. In particular, solutions are proposed to the problems of finding shared preferences, discovering communities with shared values and removing the disincentives posed by liabilities. In addition we propose a mechanism that allows an individual to negotiate on behalf of a group by proving membership in that group without revealing one's identity.

Figure 1:
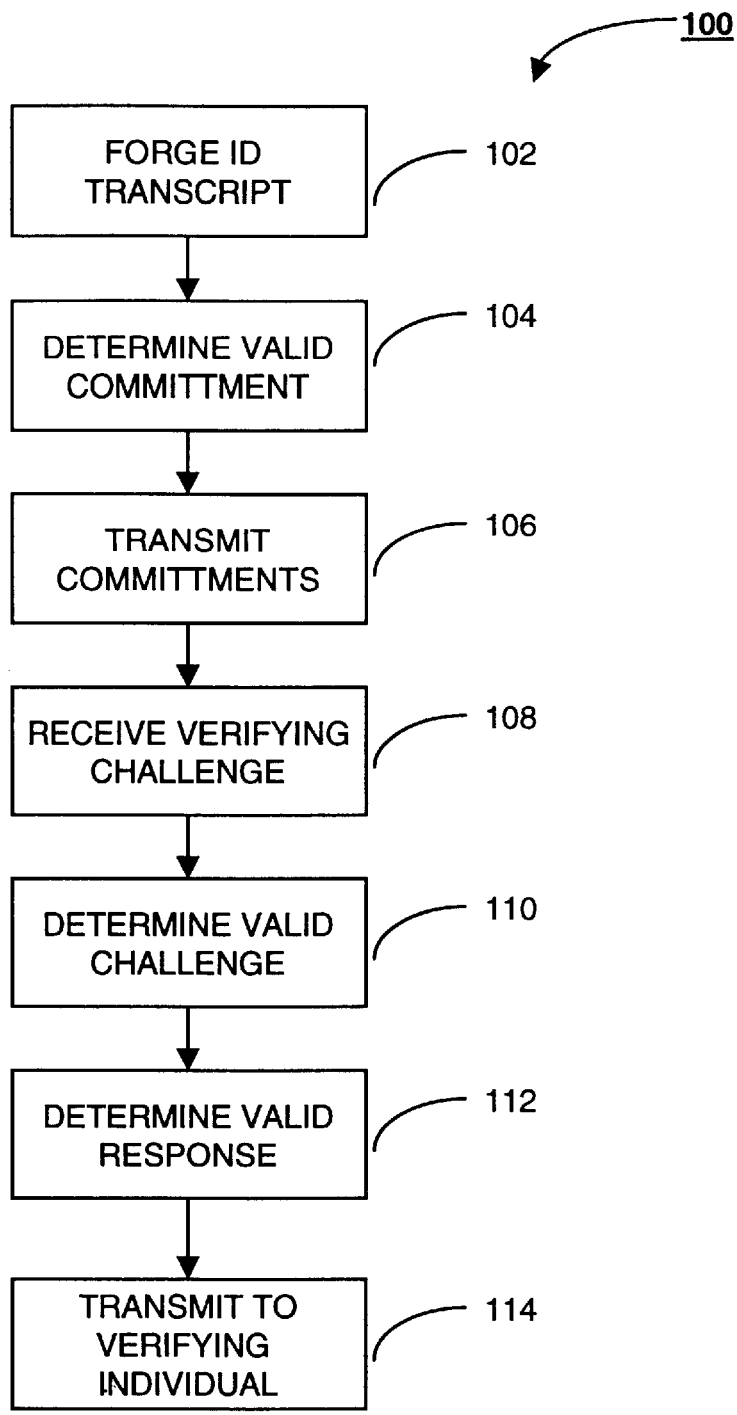
FIG. 1 is a flowchart illustrating steps that are performed in a method for enabling privacy and trust in electronic communities in an embodiment of the present invention.
Figure 2:
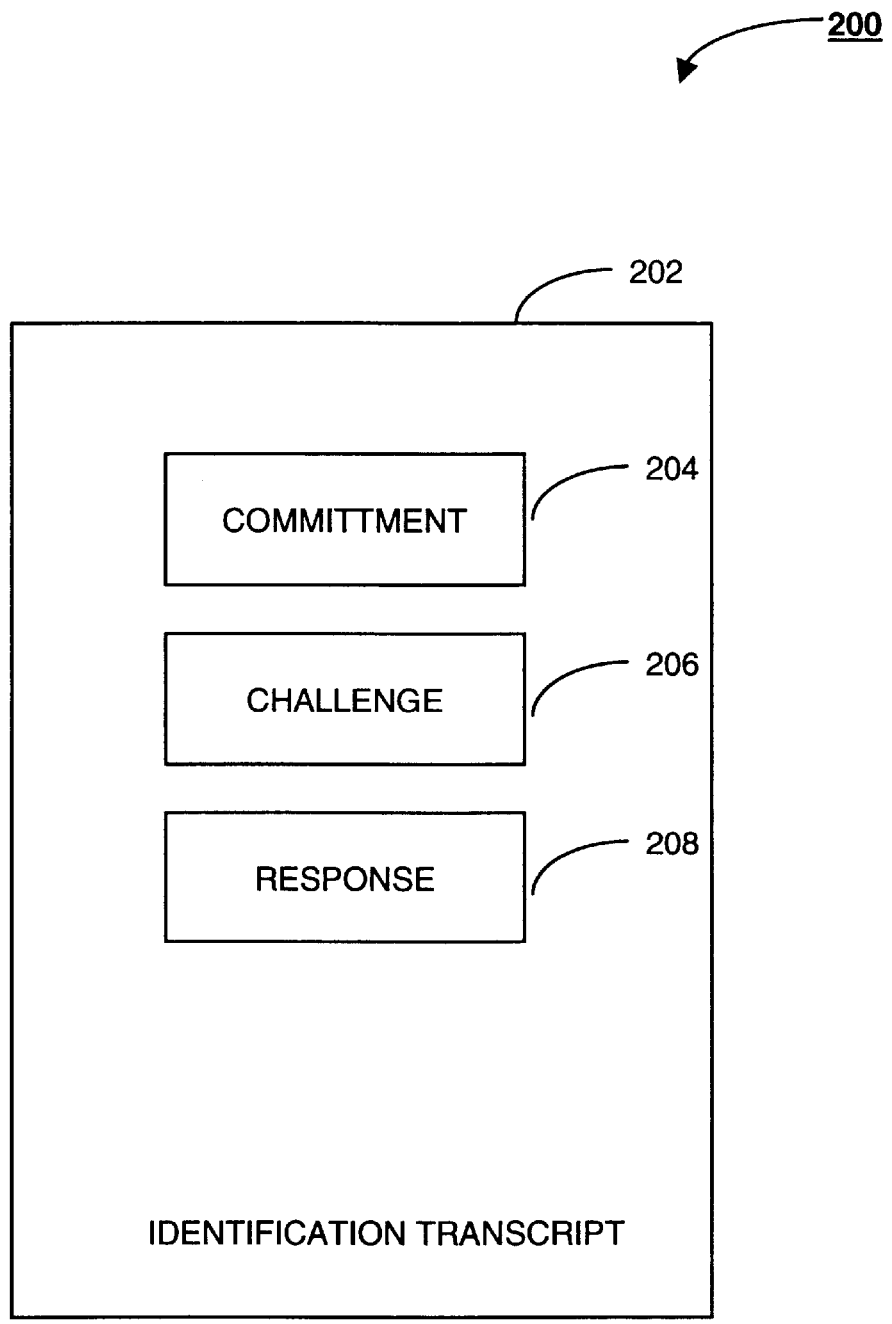
FIG. 2 is an exemplary identification transcript that is used in an embodiment of the present invention.

FIG. 1 shows a flowchart 100 illustrating an embodiment of the present invention. The method described in flowchart 100 may be used for anonymously establishing a proving individual as a member for group, wherein the proving individual has a private key. An identification transcript is forged, step 102, for least one unknown private key, wherein the transcript includes at least one forged commitment, at least one forged challenge, and at least one forged response. An identification transcript is a data structure that may be used by an embodiment of the present invention. An example of an identification transcript 202 is shown in FIG. 2, and may contain a commitment 204, a challenge 206, and a response 208. A valid commitment is calculated, step 104, based on the proving individual's private key. The at least one forged commitment and a valid commitment are transmitted to a verifying individual, step 106. A verifying challenge is received from the verifying individual, step 108, and a valid challenge is calculated based on the at least one challenge and the verifying challenge, step 110. A valid response is calculated based on the valid challenge in the valid commitment, step 112. The at least one forged challenge, the valid challenge, the at least one forged response, and the valid response are then transmitted to the verifying individual, step 114. The identification transcript may comprise a commitment, a challenge, and a response from a Schnorr identification protocol.

Figure 3:
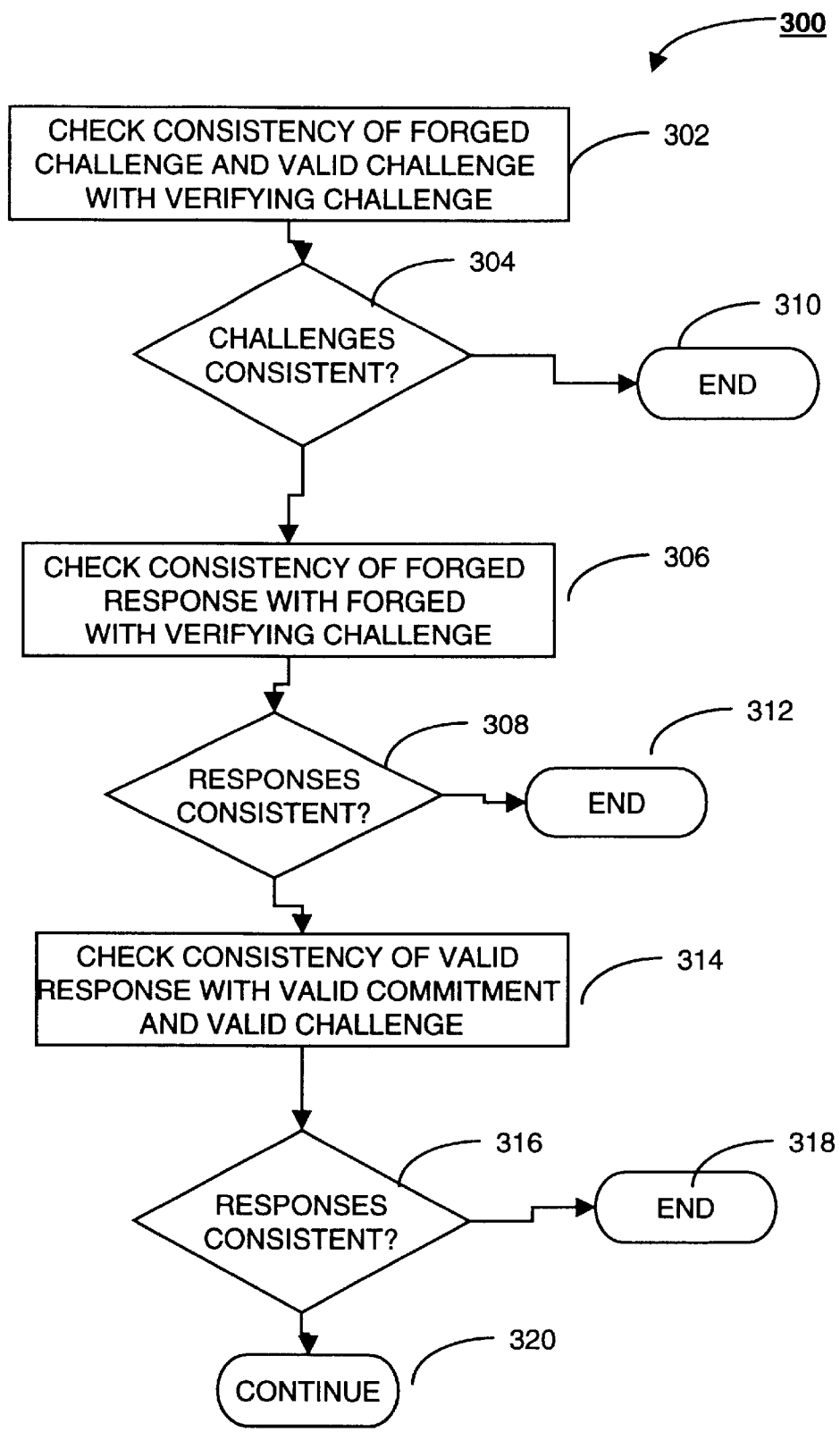
FIG. 3 is a flowchart illustrating steps that are performed for checking consistency in a method for enabling privacy and trust in electronic communities in an embodiment of the present invention.

An embodiment of the present invention may also include steps shown in the flowchart 300 of FIG. 3, in which the forged challenge and the valid challenge are verified to be consistent with the verifying challenge, step 302. A consistency check is performed, step 304. If the challenges are not consistent, then processing ends, step 310. If the challenges are consistent, then processing continues to step 306. The method may also include the step of verifying that forged response is consistent with a forged commitment and a forged challenge, step 306. A consistency check is performed, step 308, If the forged response is not consistent, then processing ends, step 312. If the forged response is consistent, then processing continues, step 314. The method may also include the step of verifying that the valid response is consistent with the valid commitment and the valid challenge, step 314. A consistency check is then performed, step 316. If the valid response is not consistent with the valid commitment and the valid challenge, then processing ends, step 318. If the valid response is consistent with the valid commitment and the valid challenge, then processing continues, step 320.

Figure 4:
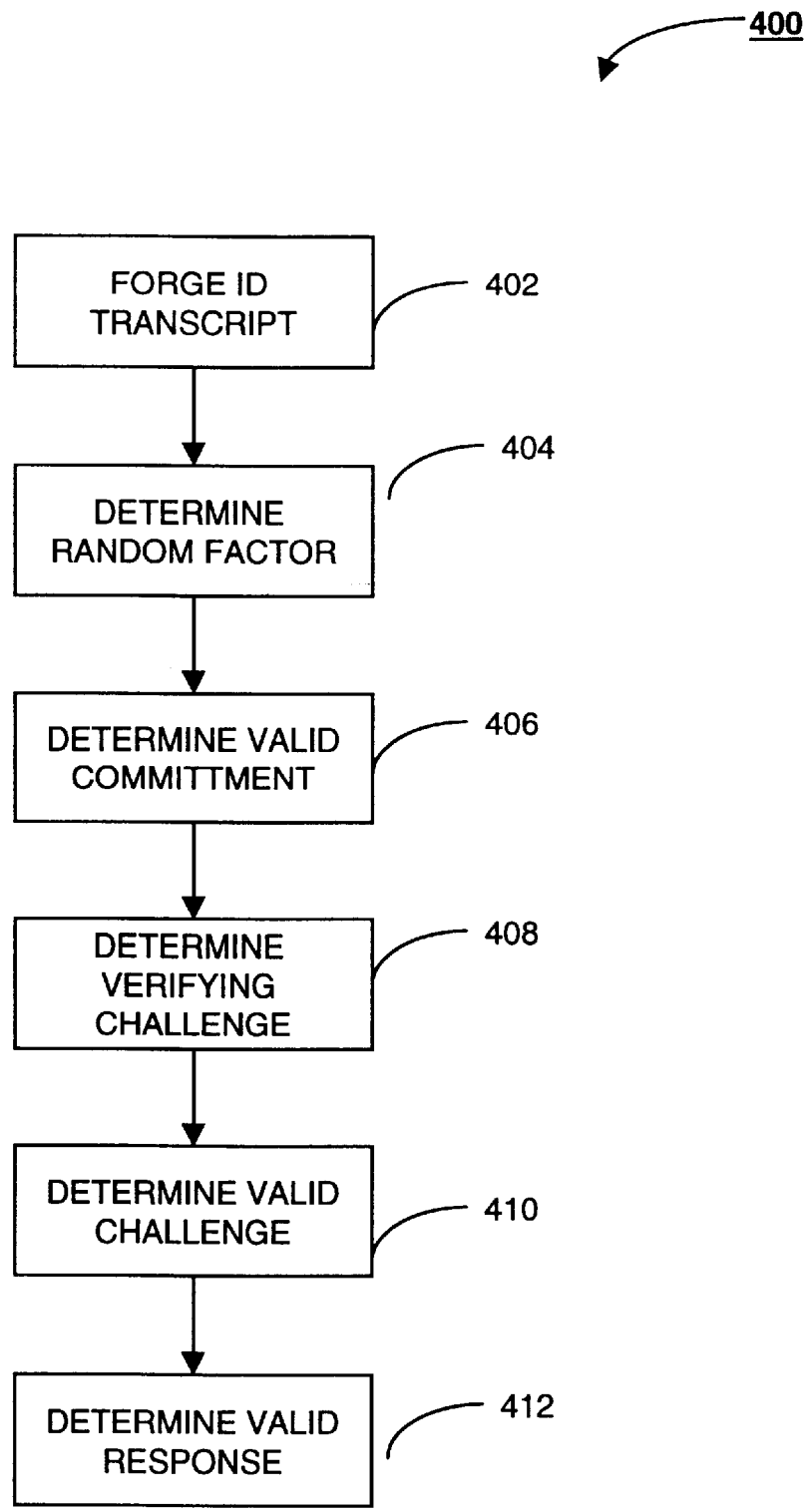
FIG. 4 is a flowchart illustrating steps that are performed in a method for enabling privacy and trust in electronic communities in an embodiment of the present invention.

Another embodiment of the present invention, shown by flowchart 400 in FIG. 4, provides a method for a signing individual to deniably sign a document intended for a recipient, wherein the signing individual as a private key and public key and the recipient has a public key. An identification transcript is forged for an unknown private key, step 402, wherein the transcript comprises a forged commitment, a forged challenge, and a forged response. A random factor is calculated, step 404, and a valid commitment is calculated based on the random factor, step 406. A verifying challenge is calculated, step 408. The verifying challenge may be a cryptographic hash of the document, the forged commitment, and the valid commitment, the signing individual's public key, or the recipient's public key. A valid challenge is calculated based on the verifying challenge and the forged challenge, step 410. A valid response is calculated based on the random factor, the valid challenge, in the signing individual's private key, step 412.

Figure 5:
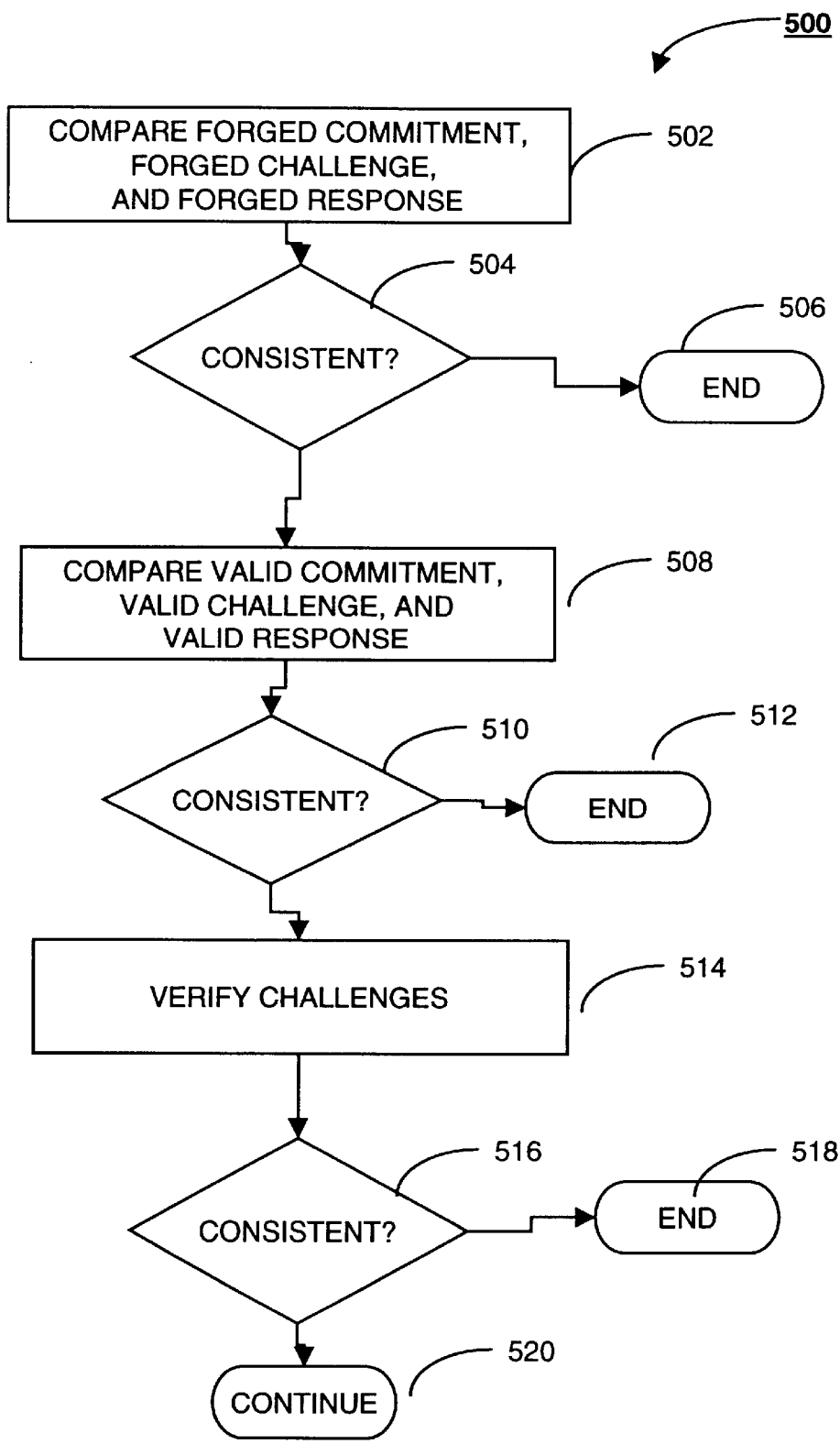
FIG. 5 is a flowchart illustrating steps that are performed in a method for checking consistency of commitments, challenges, and responses in a method for enabling privacy and trust in electronic communities in an embodiment of the present invention.

The method may also include steps shown in the flowchart 500 of FIG. 5. A forged identification transcript may be tested by verifying that the forged commitment, the forged challenge, and the forged response are consistent, step 502. A consistency check is performed, step 504, and if the forged commitment, the forged challenge, and the forged response are not consistent, then processing ends, step 506. If the forged commitment, the forged challenge, and the forged response are consistent, then processing continues to step 508, in which valid identification transcript is tested by verifying that the valid commitment, the valid challenge, and a valid response are consistent. A consistency check is performed, step 510. If the valid commitment, the valid challenge, and the valid response are not consistent, then processing ends, step 512. If the valid commitment, the valid challenge, and the valid response are consistent, then processing continues to step 514. In step 514, the challenge is tested by verifying that the valid challenge and the forged challenge are consistent with the verifying challenge. A consistency check is performed, step 516. If the valid challenge and the forged challenge are not consistent with the verifying challenge, then processing ends, step 518. If the valid challenge and the forged challenge are consistent with the verifying challenge, then processing continues, step 520.

The methods shown in FIGS. 1–5 may be performed using a variety of techniques that are discussed in the following sections. In section 2, we review the basic cryptographic capabilities required in our discussion. In section 3, we introduce a protocol for finding shared preferences and finding communities of similar interests that preserves privacy and also allows for the use of selectivity based on reputations. Moreover, we show how to allow private communication among the members of such informal communities by sharing a public key that is issued only to them. Section 4 uses deniable signatures to remove liabilities in recommendations, while allowing users to discriminate based on their view of the recommenders' reputations. Section 5 deals with two issues: proving membership in a community without revealing one's identity, and establishing the size of that community without having to list its membership. Section 6 summarizes the findings and discusses the implications of this technology for electronic communities and their self-governance. Cryptographic details for all of our protocols can be found in the Appendix.

2. Cryptographic Primitives for Communities

The mechanisms we propose rely on a variety of cryptographic techniques, which in turn exploit the use of two fundamental cryptographic primitives: hash functions and public key systems. For the benefit of the reader unfamiliar with this field we now describe the general properties of these two primitives.

In general, cryptographic functions operate on inputs such as "messages" and "keys", and produce outputs such as "ciphertexts" and "signatures". It is common to treat all of these inputs and outputs as large integers according to some standardized encoding. Throughout this specification, the reader should assume that any value involved in a cryptographic function is a large integer, no matter what it may be called.

A cryptographic hash function, H, is a mathematical transformation that takes a message m of any length, and computes from it a short fixed-length message, which we'll call H(m). This fixed length output has the important property that there is no way to find what message produced it short of trying all possible messages by trial and error. Equally important, even though there may exist many messages that hash to the same value, it is computationally infeasible to find even two values that "collide". This practically guarantees that the hash of a message can "represent" the message in a way which is very difficult to cheat. An even stronger property that we will require is that the output of a cryptographic hash function cannot be easily influenced or predicted ahead of time. Thus someone who wanted to find a hash with a particular pattern (beginning with a particular prefix, say) could do no better than trial and error. In practice, hash functions such as MD-5 and SHA are often assumed to have these properties.

Public key encryption (or signature) rely on a pair of related keys, one secret and one public, associated with each individual participating in a communication. The secret key is needed to decrypt (or sign), while only the public key is needed to encrypt a message (or verify a signature). A public key is generated by those wishing to receive encrypted messages, and broadcasted so that it can be used by the sender of the message to encode it. The recipient of this message then uses his own private key in combination with his public key to decrypt the message. While slower than secret key cryptography, public key systems are preferable when dealing with networks of people that need to be reconfigured fairly often. Popular public key systems are based on the properties of modular arithmetic.

3. Shared Preferences and Community Discovery 3.1. Motivation and Intuition

It is often the case that a group of individuals shares a number of preferences while being unaware of the existence of each other. While the Internet provides mechanisms for speeding up the process of discovering people with similar interests, it does not remove the disincentive inherent in having to disclose private information to unknown people while searching for a community that shares a given set of preferences. Consider, for example, the problem of finding someone from whom to request a recommendation about a particular topic. This can be difficult if one is reluctant to reveal one's preferences to people who might or might not share them. It would be useful to design a mechanism that circumvents this problem. In what follows we present a procedure that allows for a group of individuals to privately search for others with similar preferences while keeping their preferences private. Furthermore, this discovery process is made operational by producing keys that are available only to members of the group and allow them to communicate with each other.

Another application of this mechanism for community discovery obtains recommendations from users with similar interest profiles without contacting them directly. This application can be used in e-commerce situations to recommend products likely to be of interest based on the preferences of similar users. By maintaining both privacy and selectivity based on reputations, this mechanism allows for precise recommendations.

Community discovery can also be useful in creating additional services. For instance, as discussed in section 4, it can be useful in distributing pieces of some information among a group of people in such a way that no individual can determine the information but the group acting together can do so. Reputations for trustworthiness are an important aspect of discovering such groups, and preserving privacy can help encourage people to participate in this community service. An example is providing backup storage of private information.

These techniques could be useful not only for users providing information but also for those requesting recommendations. Examples include determining the majority opinion in a group without revealing individual preferences, or identifying significant but unpopular viewpoints. Furthermore, these protocols allow queries over a set of topics without revealing the particular question of interest. This could be useful when a sudden shift of interest in particular questions or products might change the group behavior in undesirable ways, e.g., causing changes in price levels before an e-commerce transaction is completed.

3.2 Details of our Approach

Community Discovery: Our approach to community discovery uses an idea that goes back to work by Bellare and Micali on non-interactive oblivious transfer. M. Bellare and S. Micali, "Non-interactive oblivious transfer and applications", proc. Crypto '89, 547–557. Anyone can ask a question Q by posting it on a bulletin board. For simplicity, assume that Q is a yes/no question, although our techniques generalize to arbitrary multiple-choice questions. We can associate an unpredictable random "challenge" with each question Q in a standard way, by taking the challenge to be the hash of Q together with some system-wide public keys.

To answer a question Q, create two public keys $y_0, y_1$ that when multiplied together equals the challenge associated with Q. It turns out that it is easy to create these public keys in such a way that the corresponding private key is known for one of them. However, it is widely believed to be hard to create the public keys in such a way that the corresponding private key is known for both of them. Post on the bulletin board these two public keys $y_0, y_1$. An "answer" will be rejected if these keys do not multiply together to the challenge. Otherwise, the answer is accepted, although no one can tell how a party has really answered, because that depends on whether the private key for $y_0$ is actually known (in which case the answer was no) or the private key for $y_1$ (in which case the answer was yes). There is no need to post answers anonymously. In fact, it may be desirable to require answers to be digitally signed, to prevent someone from joining both sides of the debate by answering the same question twice. Alternatively, cryptographic pre-registration techniques (e.g., using off-line electronic coins as "one-show" credentials) could be used to prevent double answering. For a description of electronic cash, see D. Chaum, A. Fiat, and M. Naor, "Untraceable electronic cash", proc. Crypto '88, 319–327.

Now anyone can encrypt a message that you can read only if you answered a question in a certain way. Suppose that A wants to send B a message M, but A only wants B to be able to read it if B answered no to question Q. Then A encrypts the message using $y_0$ as the public key. A can send this message to B directly, or post it to a bulletin board, possibly anonymously. If B's answer was no, then B knows the private key for $y_0$, and thus B can decrypt the message. Otherwise, B knows the private key for $y_1$ but not $y_0$, and cannot decrypt the message.

Community-Wide Conference Key: The mechanism described above is already enough for the community to find itself and begin a discussion. It might be desirable to generate a single key that was known to all members of the community to facilitate a community-wide discussion. One way to achieve this is to have any member of the community choose a secret key and encrypt it so that every other community member can decrypt it. For example, if I answered no to question Q, then I can choose a random "community-wide conference key" and encrypt it using the "no" public key for every answerer. All of these encryptions can be posted anonymously if desired, and signed with a proof of anonymous group membership as described in Section 5. Then everyone in the community (i.e., everyone who answered no to question Q) can decrypt to recover the community-wide conference key. It is easy for a new member to join the community in an ongoing discussion. This is achieved by posting an encryption of the conference key that the newcomer can decrypt only if he has joined the community, together with a signature of anonymous group membership so the newcomer knows that the key came from a fellow community member.

Private Preference Matching: The community discovery techniques described above could be repeated for a number of different questions. Then A could send B a message which B could read only if B answered each question a certain way, by encrypting the message so that all of the corresponding keys were necessary to decrypt. Another approach to multiple shared preferences is to perform a "secure distributed computation" to find people who answered questions in a compatible way. This can be done quite efficiently in the case where compatibility is measured by the number of yes/no questions that were answered in common.

A basic preference-matching function takes as input two lists of yes/no answers and a threshold. It outputs "true" if the number of answers where the two lists match is at or above the threshold. The one-against-many variant takes as input a "query" answer list, a "database" of answer lists, and a threshold. It outputs pointers to all answer lists in the database that have a sufficiently large match with the query list. The many-against-many variant is similar, except there are two database lists, or a single list compared against itself.

There are a number of techniques in the cryptographic literature for two or more parties to compute these kind of preference matching functions, under a wide variety of assumptions about the fault model, the amount of information leakage, the communication model, and so forth (surveyed in M. Franklin and M. Yung, "Varieties of secure distributed computing", proc. Sequences II Workshop, 1991). In the Appendix, we present one technique that is somewhat easier to describe, and quite efficient. Note that this scheme leaks a small amount of additional information, i.e., the number of matches in two preference lists rather than the one-bit decision about whether the number of matches exceeds some threshold. This is not an inherent limitation. It is a design trade-off to achieve greater efficiency.

4. Removing Liability 4.1 Motivation and Intuition

Finding someone satisfying a number of shared preferences is not enough in order to obtain a valuable recommendation. A potential recommender might be concerned about the liability that would result if the recommendation turned out to be of negative value to the requester. This is a concern for a number of communities, including malpractice-sensitive doctors, financial advisors, or even members of a recommendation system such as Xerox's Knowledge Pump (see Glance, Arregui, and Dardenne, referenced above). While anonymity might address this problem, it then generates another one, which has to do with the lack of a reputation that could be built over time. Pseudonyms allow reputations to be built over time, but they are "brittle" in the sense that uncovering the author of any message would establish the authorship of all messages with that pseudonym. Another possible approach is a contract in which the parties explicitly agree to waive liability, but this may be cumbersome and costly to devise, especially when multiple jurisdictions are involved.

We propose the use of "deniable signatures" to allow reputations and limited associations without fear of liability. With a deniable signature, the recipient of a recommendation knows it came from a person with an appropriate reputation, but cannot prove that connection to anyone else.

A further enhancement can give deniable signatures that are "convertible". The signer keeps an additional secret for each signed message which, when revealed, converts a deniable signature into an "ordinary" signature that is clearly and convincingly connected to the signer. This could give the recommender the flexibility to avoid liability as a default, while maintaining the ability to prove authorship if necessary. A further enhancement can distribute the conversion mechanism among many parties, to prevent the signer from being coerced to convert a deniable signature against his will.

4.2 Our Approach

Deniable signatures have been the focus of much attention in the cryptographic literature in recent years. In what follows, we describe one particularly efficient approach to deniable signatures that relies on ideas from Cramer, Damgaard and Schoenmakers (R. Cramer, I. Damgaard and B. Schoenmakers, "Proofs of partial knowledge and simplified design of witness hiding protocols", proc. Crypto '94, 174–187) and Jakobsson, Sako and Impagliazzo (M. Jakobsson, K. Sako and R. Impagliazzo, "Designated verifier proofs and their applications", proc. Eurocrypt '96, 143–154). It relies on a technique to prove knowledge of one out of two secret keys without revealing which is known.

To begin, we describe a generic kind of three-round proof of knowledge. The Schnorr protocol is an example that fits the model we describe. C. Schnorr, "Efficient signature generation by smart cards", Journal of Cryptology 4 (1991), 161–174. The prover knows a secret key that corresponds to a given public key. To authenticate himself to a verifier, the prover wishes to demonstrate knowledge of the secret key. They proceed as follows:

1. Prover→Verifier: cryptographic commitment based on prover's secret key;
2. Verifier→Prover: random challenge based on verifier's random coin flips;
3. Prover→Verifier: consistent response to challenge;
4. Verifier accepts if response is consistent with commitment, challenge, and prover's public key. This is convincing to the verifier because it would have been very difficult for the prover to compute a consistent response without knowing the secret key.

To create a one-out-of-two proof of knowledge, another trick is needed. Many of these three-round proofs of knowledge (including the Schnorr protocol) have the remarkable property that it is very easy to forge transcripts—without knowing the secret key. The forger works backwards, starting with a (third-round) random response, and then choosing a (second-round) random challenge. Given these, it easy to compute a (first-round) commitment that will complete a valid transcript. (Of course, this doesn't contradict the security of the proof of knowledge, since there is a big difference between being able to forge a transcript by working backwards, and being able to fool a verifier in real-time going forwards.) For the one-out-of-two proof of knowledge, the Prover forges a transcript ahead of time for the secret key that he does not know. Then the protocol is as follows:

1. Prover→Verifier: $commitment_1$, $commitment_2$;
2. Verifier→Prover: challenge (only one!);
3. Prover→Verifier: $challenge_1$, $response_1$, $challenge_2$, $response_2$ such that $challenge_1 + challenge_2 = challenge$;
4. Verifier tests the following:
   (a) consistency of $commitment_1$, $challenge_1$, $response_1$, $public\ key_1$;
   (b) consistency of $commitment_2$, $challenge_2$, $response_2$, $public\ key_2$;
   (c) $challenge = challenge_1 + challenge_2$.

The intuition behind this protocol is that the Prover is free to split the Verifier's challenge so that one of the pieces matches the pre-forged transcript. This leaves the Prover to respond to the other piece of the challenge, which he can do because he knows that secret key. If the Prover knows neither secret key, then it is very unlikely that the Verifier's challenge can be split to match two pre-forged transcripts.

These interactive protocols can be converted into non-interactive signature schemes by using the Fiat-Shamir heuristic. U. Feige, A. Fiat and A. Shamir, "Zero-knowledge proofs of identity", Journal of Cryptology 1 (1988), 77–94. The idea is that the signer plays the role of the Prover, but computes the Verifier's challenge himself using a cryptographically strong hash function such as MD5 or SHA. The signer applies the hash function to the message to be signed, the public key(s), and the commitment(s) "sent" in the first round.

Now we can describe the deniable signature scheme at an intuitive level (see Appendix for details). Sign a message using the non-interactive version of a one-out-of-two proof of knowledge, where the two public keys belong to the signer and the receiver. That is, the signer is proving knowledge of either his own private key or the receiver's private key. This signature could only have been produced by the signer or the receiver, and thus it is completely convincing to the receiver (by process of elimination!). However, no third party can tell whether the signer or the receiver has created this signature, and so the signer has deniability.

For convertibility, the signer takes advantage of the freedom that he has in generating the forged transcript. Instead of beginning his forgery with a random third-round response, the forger computes this value as the output of a cryptographic hash function. Revealing the input to the hash function would be convincing evidence as to which part of the transcript was forged, and thus which secret key must have been known to the signer. It is easy to distribute the conversion function among many parties, by using a sum of hash outputs instead of a single hash output to compute the forged response, where each party knows only one of the hash inputs.

5. Proving Membership in a Group 5.1 Motivation and Intuition

It is often the case that membership in a particular group or community can be valuable for establishing one's credentials, reputation or even for negotiating with another group or firm on behalf on one's group. And yet, there are many situations when one might desire to remain anonymous in case the group that one belongs to has an image or value that could be negative to the firm. Finally, group membership could be established without revealing the particular individual identity, which could be used as authorization or capability for some transaction or to negotiate with a firm or individual on behalf of the whole group.

There are a number of schemes in the cryptographic literature that can be used to solve these problems. We show one such scheme by adapting the approach from the previous section. One drawback of what we present here is that the effort involved (and the size of the messages) is proportional to the size of the group. It may be desirable to hide one's identity within a smaller group, giving up a degree of anonymity for greater efficiency.

5.2 Approach

The deniable signature scheme from the previous section relied on a kind of "one-out-of-two" proof of knowledge. The message signer proved that he knew either his own private key or the recipient's private key. This technique generalizes easily to a 1-out-of-n proof of knowledge, which is useful for anonymously proving membership in a group. It also generalizes to a t-out-of-n proof of knowledge, which is useful for anonymously demonstrating negotiating power. These generalizations can be realized as either an interactive identification protocol or a non-interactive signature scheme. We describe both of these generalizations following. See Cramer, Damgaard, and Schoenmakers, referenced above.

For a 1-out-of-n proof of knowledge, the prover begins by forging the Schnorr transcript for the n−1 private keys that he does not know. Then the protocol is as follows:

1. Prover→Verifier: commitment$_1$, . . . , commitments$_n$;
2. Verifier→Prover: challenge (only one!);
3. Prover→Verifier: challenge$_1$, response$_1$, . . . , challenge$_1$, response$_n$ such that challenge$_1$+. . . +challenge$_n$=challenge;
4. Verifier tests the following:
    (a) consistency of commitment$_i$, challenge$_i$, response$_i$, public key$_i$ for every i, $1 \leq i \leq n$;
    (b) challenge=challenge$_1$+. . . +challenges$_n$.

The intuition is as in the one-out-of-two case. The prover has the freedom to choose all but one of the challenges, and can use his knowledge of the secret key to respond to the one challenge he cannot control. The Verifier cannot tell which transcripts were forged ahead of time.

For proving knowledge of t-out-of-n private keys, everything is the same as before except for the relationship of challenge, challenge$_1$, . . . , challenge$_n$. There must be a degree n−t polynomial $f(x)$ such that $f(i)$=challenge$_i$ for every i, $1 \leq i \leq n$, and such that $f(0)$=challenge. The intuition is that the Prover can forge transcripts ahead of time for the n−t private keys that he does not know, and then interpolate to find $f(x)$ (uniquely determined) from those challenges together with the challenge from the verifier.

Signature versions of both of these protocols can be derived by using the Fiat-Shamir heuristic as before. More details of the cryptographic schemes described in this section can be found in the Appendix.

The signature version of the 1-out-of-n proof of knowledge is useful for distributing community-wide conference keys as discussed in Section 3. Say that I have created a conference key for everyone who answered yes to question Q. I randomly choose an additional n−1 parties who answered question Q, without knowing how they answered. Then I can prove knowledge of one of the private keys corresponding to the set of n "yes" public keys. By choosing a suitably large n, my identity is hidden well. By signing the encrypted conference keys in this way, anyone who successfully decrypts the conference key will have the added assurance that it was created by a fellow member of the community.

There are variations on these ideas in the cryptographic literature that allow for "identity escrow". This means that the true identity of the prover or signer might be recoverable under exceptional circumstances (e.g., with a search warrant). Relatively efficient implementations can be found in J. Camenisch and M. Stadler, "Efficient group signatures schemes for large groups", Proc. Crypto '97, 410–424; and J. Kilian and E. Petrank, "Identity Escrow", Proc. Crypto '98, 169–185. These schemes also scale well as the size of the group increases, which is not the case for the simpler schemes described in this section.

6. Discussion

In this specification, a number of new techniques for finding members of groups sharing similar preferences and obtaining their recommendations in ways that protect privacy while also allowing reputations to be built and updated have been introduced. Moreover, these mechanisms do not require the creation of trusted third parties and their attendant problems. Reputations are extremely valuable in the context of electronic commerce, for when authenticated they provide a mechanism for trust to established, thus circumventing a number of costly transactions. F. Fukuyama, "Trust: the social virtues and the creation of prosperity", Free Press (1996). Trust is an important component of an efficient market, since fake postings of particular messages can lead to inefficient allocation of resources. Witness the recent posting of a bogus Bloomberg financial news story, which sent shares of a small technology company soaring 31 percent in one day, only to fall to previous values when the story proved false. The New York Times, Apr. 8, 1999.

Another application we designed consists in the removal of the disincentive associated with the liability implied in issuing recommendations, thus making recommender systems more effective. Finally, we showed how individuals can prove membership in groups without revealing their identity, thus paving the way for negotiations between groups that seek to remain anonymous and firms that could profit from dealing with them.

These mechanisms involve trade-offs among computational efficiency, the leaking of information and ease of use. These trade-offs can be resolved differently depending on the specific application. For example, one may want to make it easier for new people to join a community by lowering the number of passwords and preferences that need to be listed, at the expense of reduced privacy. Another instance would be one in which everybody in a group shares the same key, which is a simple and secure procedure as long as no one leaves the group.

Additional trade-offs appear when one considers spoofing, whereby people can present false preferences in order to gain access to privileged information or to deter others from gaining an advantage from a weak adversary. One response might be anonymity, but at the cost of losing the benefit of reputation building. Another one could be analogous to biological situations, where false signaling is used by many organisms to deter attack or to gain access to valuable resources. A strategy that has evolved to address the problem of spoofing in that context is for signals themselves to be costly to produce, and thus to imitate. A. Zahavi and A. Zahavi, "The Handicap Principle: A Missing Piece of Darwin's Puzzle", Oxford Univ. Press (1997). Similar strategies could be applied to electronic communities by increasing the number of challenges needed to access a given group, or by imposing a waiting period. On the other hand, this could deter legitimate new people from joining the group. Moreover, even if the trade-offs could be negotiated successfully, there remains the problem of misusing these techniques, as in the case of fraudulent financial transactions, insider trading or the unauthorized collection of personal data.

In spite of the great potential for electronic commerce that the Web is enabling through its global reach, there are vast areas of knowledge and expertise that remain untapped for lack of mechanisms that ensure privacy and trust. The techniques that we proposed make it easier to access vast repositories of information that are not readily known to producers and consumers, thus leading to improvements in economic efficiency through the more focused use of resources.

Appendix: Cryptographic Details

Discrete Log Problem: Let p be a large prime, and let q be a large prime factor of p−1. Let g be an element of order q modulo p. That is, $g, g^2, \ldots, g^q$ are all distinct elements modulo p, and $g^q=1$ mod p. It is widely believed that the "discrete log" problem is hard in this setting: Given g, p, y, find x such that $g^x=y$ mod p.

Discrete Log Based Community Discovery: The values p and g are system-wide parameters. The challenge associated with question Q is the cryptographic hash of Q, p, and g. To answer the question Q with b=0 or b=1, choose a random x between 1 and q, and compute $y_b=g^x$ mod p. Then compute $y_{1-b}=c/y_b$ mod p. Then post on the bulletin board an "answer" $(y_0,y_1)$. If $y_0 y_1$ mod p is not equal to c, then the answer is considered to be invalid, and it is ignored. Otherwise, the answer is accepted. If the answer is accepted, then it is extremely unlikely that the answering party could know the discrete log of both $y_0$ and $y_1$. If someone encrypts a message using one of $y_0$ or $y_1$ as the public key, a party will be able to decrypt it only if he knows the corresponding private key.

One example of a discrete log based public key encryption scheme that can be used is due to ElGamal. T. ElGamal, "A public key cryptosystem and a signature scheme based on discrete logarithms," IEEE Transactions on Information Theory 31 (1985), 469–472. In the ElGamal public key encryption scheme, the public key for a user is some g, p, y, and the corresponding private key is the discrete log x such that $g^x=y$ mod p. The encryption of message m is ($g^r$ mod p; $my^r$ mod p), where r is chosen randomly by the encryptor. Given a ciphertext (u,v), the decryptor computes $v/u^x$ mod p=m. Without knowing x, it is believed to be hard to decrypt ciphertexts (by an assumption related to the hardness of the discrete log problem).

Xor-Homomorphic Encryption based on Quadratic Residuosity Encryption (see S. Goldwasser and S. Micali, "Probabilistic public key encryption," Journal of Computer and System Sciences 28 (1984), 270–299): Let p, q be two large primes such that p=q=3 mod 4. Let N=pq. Let QR={$r^2$ mod N: gcd(r,N)=1} and let NQR={$-r^2$ mod N: gcd(r,N)=1}. These two sets are disjoint. Given a random element from one of the two sets, and given the factorization of N, there is an efficient procedure to determine which set it came from. Without knowing the factorization of N, it is widely believed to be hard to tell which set a random element came from. To encrypt bit b, choose a random r such that gcd(r,N)=1 and compute $E(b)=(-1)^b r^2$ mod N. To decrypt an encrypted bit c, use the factorization of N to determine if c is in QR or NQR. D(c)=0 if c is in QR, and D(c)=1 if c is in NQR. This encryption scheme is xor-homomorphic because $E(b_1)E(b_2)$ mod N is an encryption of $b_1 \oplus b_2$.

Private Preference Matching: Here is a protocol for Alice and Bob to evaluate the basic preference-matching function using any xor-homomorphic encryption scheme. Alice and Bob each encrypt their answers to the survey bit-by-bit using Alice's public key. Alice sends her encrypted answers $(c_l, \ldots, C_k)$ to Bob. Bob computes encryptions of the xor's of their two answer lists, and returns these encryptions to Alice in a random order. When Alice decrypts, the number of zeroes tells her the number of times their answers matched (and nothing more).

A related approach can evaluate the many-against-many version and other variants. Each participant encrypts his answers to the survey using the same system-wide public key. These encrypted answers are stored in the system database. To find if two participants have similar preferences, the database computes encryptions of the bit-wise xor's of their answers, and then send these encryptions (in a random order) to a separate entity that knows the system-wide private key. This separate entity can decrypt and count the number of zeroes, and then report back whether there was a high match or not.

Schnorr Public Key Signature Scheme: In the Schnorr public key signature scheme, the public key for a user is some g,p,y, and the corresponding private key is the discrete log x such that $g^x=y$ mod p. The signature of message m is ($g^r$ mod p, c, r+cx mod q), where r is chosen randomly by the signer, and where c is random but not chosen by the signer. One way to get c is to compute c=H(g, p, y, m, $g^r$ mod p) for some cryptographically strong hash function (e.g., MD-5 or SHA). To verify that (z,c,u) is a signature of m with respect to public key g,p,y, the verifier confirms that $zy^c=g^u$ mod p and that c=H(g, p, y, m, z).

Deniable Schnorr Signature: Suppose that party i wants to deniably sign a message m to party j. The deniable signature will be $z_i, c_i, u_i, z_j, c_j, u_j$, where $[z_i, c_i, u_i]$ is a valid Schnorr identification transcript for prover i, and where $[z_j, c_j, u_j]$ is a valid Schnorr identification transcript for prover j, and where $c_i+c_j=H(m, z_i, z_j, y_i, y_j, p, g)$. Party i proceeds as follows:

1. Forge a transcript $[z_j, c_j, u_j]$ of a Schnorr identification protocol for prover j, by choosing random $u_j, c_j \in [1 \ldots q]$ and computing $z_j = g^{u_j}/y_j^{c_j}$ mod p;
2. Choose a random $r_i \in [1 \ldots q]$ and compute $z_i = g^{r_i}$ mod p. (to "begin" the id protocol for prover i.);
3. Compute c=H(m, $z_i, z_j, y_i, y_j$, p, g), and let $c_i = c - c_j$ mod q;
4. Compute $u_i = r_i + c_i x_i$ mod q. (To "complete" the id protocol for prover i.).

A deniable signature is valid if the two identification transcripts are valid, and if the challenges add up to the hash output as indicated. This signature could only be efficiently computed by someone who knows the private key of party i or party j. That is why it is convincing to party j when he receives it, and why it is deniable by party i afterwards.

Anonymous Group Membership: For notational convenience, assume the group is parties 1 through n, and the prover is party 1. The prover begins by forging Schnorr transcripts $[z_2, c_2, u_2], \ldots, [z_n, c_n, u_n]$ for the private keys he does not know. The protocol proceeds as follows:

1. Prover (party 1)→Verifier: $z_1, \ldots, z_n$, where $z_1 = g^{r_1}$ mod p for a random $r_1 \in [1 \ldots q]$;
2. Verifier→Prover: c random in $[1 \ldots q]$;
3. Prover→Verifier: $(c_1, u_1), \ldots, (c_n, u_n)$ such that $c = c_1 + \ldots + c_n$ mod q and such that $u_1 = r_1 + c_1 x_1$ mod q.
4. Verifier accepts if $z_i y_i^{c_i} = g^{u_i}$ mod p for all i, $1 \leq i \leq n$, and if $c = c_1 + \ldots + c_n$ mod q.

For the signature version of anonymous group membership, the signer computes this own challenge c=H(m, $z_1, \ldots, z_n, y_1, \ldots, y_n$, p, g) where H is a cryptographically strong hash function and m is the message to be signed.

Anonymous Group Power: For notational convenience, assume the group is parties 1 through n, and the prover knows the private keys of parties 1, ..., t. The prover begins by forging Schnorr transcripts $[z_{t+1}, c_{t+1}, u_{t+1}], \ldots, [z_n, c_n, u_n]$ for the private keys he does not know. The protocol proceeds as follows:

1. Prover→Verifier: $z_1, \ldots, z_n$, where $z_1 = g^r$ mod p for a random $r_1 \in [1 \ldots q]$ for every i, $1 \leq i \leq t$;

2. Verifier→Prover: C ∈ [1 . . . q];

3. Prover→Verifier: $(c_1,u_1), \ldots, (c_n,u_n)$ such that $u_i=r_i+c_i x_i$ mod q for every i, $1 \leq i \leq t$, and such that $c_i=f(i)$ mod q for the unique polynomial f of degree at most n−t satisfying $f(0)=c$ mod q and $f(j)=c_j$ mod q for all j, $t+1 \leq j \leq n$;

4. Verifier accepts if $z_i y_i^{c_i} = g^{u_i}$ mod p for all i, $1 \leq i \leq n$, and if there is a polynomial f of degree at most n−t such that $f(0)=c$ mod q and $f(i)=c_i$ mod q for all i, $1 \leq i \leq n$.

For the signature version of anonymous group power, the signer computes his own challenge $c=H(m, z_1, \ldots, z_n, y_1, \ldots, y_n, p, g)$ where H is a cryptographically strong hash function and m is the message to be signed.

It should be appreciated that the description herein is merely illustrative, and should not be read to limit the scope of the invention nor the claims hereof.

What is claimed is:

1. A method for anonymously establishing a proving individual as a member of a group for purposes of establishing a community recommendation without liability, wherein the proving individual has a private key, comprising the computerized steps of:

forging an identification transcript for at least one unknown private key, wherein the transcript comprises at least one forged commitment, at least one forged challenge, and at least one forged response, the step of forging performed by any of one or more computers;

calculating a valid commitment based on the proving individual's private key, the step of calculating a valid commitment performed by any of one or more computers;

transmitting the at least one forged commitment and the valid commitment to a verifying individual, the step of transmitting the at least one forged commitment and the valid commitment performed by any one or more computers;

receiving a verifying challenge from the verifying individual, the step of receiving the verifying challenge performed by any one or more computers;

calculating a valid challenge based on the at least one forged challenge and the verifying challenge, the step of calculating the valid challenge performed by any of one or more computers;

calculating a valid response based on the valid challenge and the valid commitment, the step of calculating the valid response performed by any of one or more computers;

transmitting the at least one forged challenge, the valid challenge, the at least one forged response, and the valid response to the verifying individual, the step of transmitting the at least one forged challenge performed by any of one or more computers;

verifying that the at least one forged challenge and the valid challenge are consistent with the verifying challenge, the step of verifying that the at least one forged challenge and the valid challenge are consistent performed by any of one or more computers;

verifying that the at least one forged response is consistent with the at least one forged commitment and the at least one forged challenge, the step of verifying that the at least one forged response is consistent with the at least one forged commitment and the at least one forged challenge performed by any of one or more computers; and verifying that the valid response is consistent with the valid commitment and the valid challenge, the step of verifying that the valid response is consistent with the valid commitment and the valid challenge performed by any of one or more computers.

2. The method of claim 1, wherein the identification transcript comprises a commitment, a challenge, and a response from a Schnorr identification protocol.

3. The method of claim 1, wherein:

the transcript comprises a plurality of forged commitments, a plurality of forged challenges, and a plurality of forged responses.

\* \* \* \* \*